(12) United States Patent
Taneja et al.

(10) Patent No.: US 10,469,826 B2
(45) Date of Patent: Nov. 5, 2019

(54) METHOD AND APPARATUS FOR ENVIRONMENTAL PROFILE GENERATION

(71) Applicant: SAMSUNG ELECTRONICS CO., LTD., Suwon-si (KR)

(72) Inventors: Aman Taneja, Noida (IN); Mayank Jain, Noida (IN); Nishant Bugalia, Noida (IN); Prem K. Kalra, New Delhi (IN); Subodh Kumar, New Delhi (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 14/822,474

(22) Filed: Aug. 10, 2015

(65) Prior Publication Data

US 2016/0042520 A1 Feb. 11, 2016

(30) Foreign Application Priority Data

Aug. 8, 2014 (IN) .......................... 2266/DEL/2014
Jun. 3, 2015 (KR) ........................ 10-2015-0078522

(51) Int. Cl.
*G06K 9/00* (2006.01)
*H04N 13/204* (2018.01)
(Continued)

(52) U.S. Cl.
CPC ....... *H04N 13/204* (2018.05); *G06K 9/00335* (2013.01); *G06K 9/00362* (2013.01); *G06K 9/00624* (2013.01); *G06K 9/6289* (2013.01); *G06T 7/70* (2017.01); *G06T 2207/10024* (2013.01); *G06T 2207/10028* (2013.01); *G06T 2207/20224* (2013.01);
(Continued)

(58) Field of Classification Search
CPC ............ G06T 7/70; G06T 2207/10028; G06T 2210/61; G06T 2207/10024; G06K 9/6289; G06K 9/00362; G06K 9/00624; H04N 13/0253

See application file for complete search history.

(56) References Cited

U.S. PATENT DOCUMENTS 7,174,029 B2   2/2007  Agostinelli et al.
7,836,093 B2   11/2010 Gobeyn et al.
(Continued)

FOREIGN PATENT DOCUMENTS

CN   101897135 A   11/2010
CN   102339380 A   2/2012
(Continued)

OTHER PUBLICATIONS

Written Opinion dated Dec. 14, 2015 issued by International Searching Authority in counterpart International Patent Application No. PCT/KR2015/008351.
(Continued)

*Primary Examiner* — Samir A Ahmed
(74) *Attorney, Agent, or Firm* — Sughrue Mion, PLLC

(57) ABSTRACT

A method for generating an environmental profile is provided. The method for generating environmental profile includes generating an image of an environment by capturing the environment with at least one recording device, detecting a change of an object in the environment based on the image, and generating an environmental profile based on the change of the object.

19 Claims, 14 Drawing Sheets

(51) Int. Cl.
- *G06K 9/62* (2006.01)
- *G06T 7/70* (2017.01)
- *H04N 13/254* (2018.01)
- *H04N 13/271* (2018.01)

(52) U.S. Cl.
CPC .............. *G06T 2207/30241* (2013.01); *G06T 2207/30244* (2013.01); *G06T 2210/61* (2013.01); *H04N 13/254* (2018.05); *H04N 13/271* (2018.05)

(56) References Cited

U.S. PATENT DOCUMENTS

| | | | |
|---|---|---|---|
| 8,068,879 B2 | 11/2011 | Bodas et al. | |
| 8,081,158 B2 | 12/2011 | Harris | |
| 2003/0088832 A1 | 5/2003 | Agostinelli et al. | |
| 2004/0037469 A1 | 2/2004 | Werner et al. | |
| 2007/0188623 A1* | 8/2007 | Yamashita | G06T 5/004 |
| | | | 348/222.1 |
| 2008/0111883 A1 | 5/2008 | Maolin et al. | |
| 2008/0167913 A1 | 7/2008 | Wiswell et al. | |
| 2009/0150330 A1 | 6/2009 | Gobeyn et al. | |
| 2009/0226046 A1* | 9/2009 | Shteyn | G06K 9/00711 |
| | | | 382/118 |
| 2010/0164956 A1* | 7/2010 | Hyndman | G06F 3/011 |
| | | | 345/427 |
| 2011/0161338 A1* | 6/2011 | Moore | H04L 41/046 |
| | | | 707/758 |
| 2011/0222757 A1 | 9/2011 | Yeatman, Jr. et al. | |
| 2011/0280439 A1 | 11/2011 | Harrison | |
| 2012/0054645 A1* | 3/2012 | Hoomani | G06F 17/2836 |
| | | | 715/758 |
| 2012/0054646 A1* | 3/2012 | Hoomani | A63F 13/79 |
| | | | 715/758 |
| 2012/0169583 A1 | 7/2012 | Rippel et al. | |
| 2012/0232977 A1 | 9/2012 | Calman et al. | |
| 2012/0233003 A1 | 9/2012 | Calman et al. | |
| 2012/0265616 A1 | 10/2012 | Cao et al. | |
| 2013/0246942 A1* | 9/2013 | Merrifield | G06Q 50/01 |
| | | | 715/757 |
| 2013/0346168 A1 | 12/2013 | Zhou et al. | |
| 2015/0178956 A1* | 6/2015 | Davis | G06T 11/001 |
| | | | 345/582 |

FOREIGN PATENT DOCUMENTS

| | | |
|---|---|---|
| CN | 103760968 A | 4/2014 |
| CN | 103761505 A | 4/2014 |
| JP | 2004-287835 A | 10/2004 |
| JP | 2012-022570 A | 2/2012 |
| KR | 10-2010-0110137 A | 10/2010 |
| WO | 2011/044270 A1 | 4/2011 |

OTHER PUBLICATIONS

International Searching Authority dated Dec. 14, 2015 issued by International Searching Authority in counterpart International Patent Application No. PCT/KR2015/008351.
Communication dated Mar. 15, 2018, issued by the European Patent Office in counterpart European Patent Application No. 15830701.7.
Communication dated Nov. 27, 2018, issued by the Indian Patent Office in counterpart Indian Application No. 2266/DEL/2014.
Communication dated Mar. 5, 2019 issued by the State Intellectual Property Office of P.R. China in counterpart Chinese Application No. 201580042622.3.

* cited by examiner

METHOD AND APPARATUS FOR ENVIRONMENTAL PROFILE GENERATION

CROSS REFERENCE TO RELATED APPLICATIONS

This application claims priority from Indian Patent Application No. 2266/DEL/2014, filed on Aug. 8, 2014 in the Indian Patent Office, and Korean Patent Application No. 10-2015-0078522, filed on Jun. 3, 2015 in the Korean Intellectual Property Office, the disclosures of which are incorporated herein in their entireties by reference.

BACKGROUND

Field

Methods and apparatuses consistent with exemplary embodiments relate to a method and apparatus for generating a environmental profile based on sensing of an environment using a recording device such as a point cloud camera.

2. Description of the Related Art

The following background discussion includes information that may be useful in understanding the present invention. It is not an admission that any of the information provided herein is prior art or relevant to the presently claimed invention, or that any publication specifically or implicitly referenced is prior art.

Most of the conventional recommendation systems rely on a user's digital life to identify user's choice and to generate profile. Based on the profile thus generated, it is possible to present appropriate recommendations to the user. Some of the prior art documents describing the aforesaid principle are U.S. Publication No. 20120232977 and U.S. Publication No. 20120233003.

U.S. Publication No. 20120232977 describes identifying user's financial behavior & user's favorites and assisting the user based on that. The financial behavior data may be determined based on credit, debit, and other demand deposit account purchases/transactions. It also does a real-time video stream analysis to find objects from a video and assists the user by selecting/recommending products and businesses.

U.S. Publication No. 20120233003 describes assisting the user while making purchases via mobile devices for e-commerce activities by doing a real-time video analysis of the products/items.

In addition to generating profile based on a user's digital life, it is possible to create profile based on a real life environment and more particularly based on objects and activities sensed in the environment. Apart from generation of recommendations, the profile thus generated can be beneficially used for generation of alerts, for example in a home automation system, a security system, etc. In order to generate such profile, reliance may have to be placed on various electronic devices, including for example, image capturing devices, sound capturing devices, etc. Some of the documents describing generation of profile based on sensing of an environment are U.S. Pat. No. 8,081,158, U.S. Publication No. 20080167913, U.S. Publication No. 20040037469, U.S. Publication No. 20030088832 and U.S. Pat. No. 8,068,879.

U.S. Pat. No. 8,081,158 describes using camera to capture image and based on the image characteristics delivering screen content. The idea primarily identifies users' Age & Gender and accordingly delivers screen content (e.g. Advertisements, programs etc.)

U.S. Publication No. 20080167913 describes detecting a physical object within the specified proximity of a component of a computer system, wherein a computer system submits an accessed-object-identifier for the physical object to a content portal. The invention facilitates delivering content (e.g., advertisements, games, multi-media clips, etc.) based on the object's physical characteristics. The object can be anything (e.g., a bottle, a glass, a finger, a hat, etc.) and should be within a specified proximity of a component of table top computer system. The idea is to identify the product (or its category) and present related content for display on the table top computer system.

U.S. Publication No. 20040037469 describes using sensor devices for object detection and then controls a display device based on the detected object. This invention relates to a device for the object-oriented control of information display devices (e.g. advertising carriers). The objects in question are primarily humans, but may also be other objects such as vehicles.

U.S. Publication No. 20030088832 describes system and method for the display of advertising information is provided, wherein the system is able to sense the presence and obtain characteristics of individuals in the immediate environment of the display. This idea identifies user's characteristics (like user's movement, gender, age, and race) and uses this information to present material on the display unit.

U.S. Pat. No. 8,068,879 describes sensors on a personal communication device monitoring the environment around the device. Based on an analysis of that monitoring, an appropriate visual message is shown on an outside display screen of the device. The visual message is targeted towards those around the device rather than to the device's user.

It can be observed from the above documents that image capturing devices and analysis of the captured image play a pivotal role in this domain. The aforesaid documents primarily use an image capturing devices such as RGB cameras for object detection/identification and hence, are not in a position to determine depth parameters. It would be appreciated however, that generation of a profile which includes depth parameters (or in other words based on shape of the object present in the environment) provides a better quality profile. While, such limitation can be countered during processing, the same leads to cost inefficiency, owing to requirement of exorbitant image processing techniques, thereby rendering a profile generation system non-efficient.

In addition to the above, it has been found that when low resolution images obtained from RGB cameras are processed for profile generation, the quality of the profile generated is not satisfactory. While, such limitation can be countered by using high resolution cameras, the same leads to cost inefficiency.

Even if a profile generation system uses capturing device that are specifically designed to capture high resolution images, issues relating to level of illumination of the environment play a spoil sport in attaining the desired results as the capturing device require a pre-determined illumination or sufficiently enlightened environment to detect any object or living or any movement occurring in the environment.

Thus, there remains a need to provide improved methods and systems for generation of profile for an environment based on sensing of objects in the environment, changes occurring in the environment, activities occurring in the environment and interactions occurring in the environment.

SUMMARY

An aspect of the exemplary embodiments relates to a method for generating environmental profile for generating profile of an environment around an object by detecting a change of the object in a generated image by using a recording device with a point cloud camera, and an environmental profile generating device thereof.

According to an aspect of an exemplary embodiment, there is provided a method for generating an environmental profile, the method including: generating an image of an environment by capturing the environment with at least one recording device; detecting a change of an object in the environment based on the image; and generating an environmental profile of the environment based on the change of the object.

The at least one recording device may include one of a RGB camera, a thermal camera, a depth camera, and a point could camera.

The method may further include generating a recommendation for a user related to the environment based on the environmental profile.

The generating may include generating the environmental profile based on a time when the change of the object is detected and a type of the change of the object.

The method may further include analyzing an audio signal of the environment using an audio sensor, wherein the detecting includes detecting the change of the object based on the audio signal.

The generating may include generating the environmental profile based on relevance between the image and a user.

The change of the object may include one of addition, deletion, replacement, modification, change of location with respect to the object.

The method may further include outputting at least one of recommendation, notification and warning for a user based on the change of the object.

The detecting may include measuring a frequency of a change of the object, and the generating may include generating the environmental profile based on frequency of the change of the object.

The method may further include determining a user's usage pattern of the object based on the change of the object, wherein the generating includes generating environmental profile based on the usage pattern of the user.

According to another aspect of an exemplary embodiment, there is provided an apparatus for generating an environmental profile, the apparatus including: an image generator configured to generate an image of an environment by capturing the environment; a detector configured to detect a change of an object in the environment based on the image; and a profile generator configured to generate an environmental profile based on the change of the object.

The image generator may include at least one of a RGB camera, a thermal camera, a depth camera, and a point could camera.

The profile generator may generate a recommendation for a user related to the environment based on the environmental profile.

The profile generator may generate the environmental profile based on a time when the change of the object is detected and a type of the change of the object.

The apparatus may further include an audio sensor configured to analyze an audio signal of the environment, wherein the detector detects a change of the object based on the audio signal.

The profile generator may generate the environmental profile based on relevance between the image and a user.

The change of the object may comprise at least one of addition, deletion, replacement, modification, change of location with respect to the object.

The profile generator may output at least one of recommendation, notification and warning for a user based on the change of the object.

The profile generator may generate environmental profile based on frequency of the change of the object.

The profile generator may generate the environmental profile based on a user's usage pattern of the object determined based on the change of the object.

According to another aspect of an exemplary embodiment, there is provided a method for generating an environmental profile, the method including: capturing parameters representing an environment using at least one recording device; detecting at least one object in the environment based on the parameters; and generating an environmental profile indicating a characteristic of the environment based on the object.

The parameters may include point cloud data of the object.

The detecting may include: extracting a 3D exterior of the object based on the point cloud data; and retrieving object information matching the 3D exterior from an object database.

The object may include a human related to the environment.

The generating may include comparing the parameters with old parameters previously detected from the environment; detecting a change of the environment based on a result of the comparing; and analyzing the characteristic of the environment based on the change.

The characteristic of the environment may include a behavior pattern of a human related to the environment. The method may further include outputting a control signal for controlling at least one device existing in the environment based on the environmental profile.

DETAILED DESCRIPTION OF THE INVENTION

Figure 1:
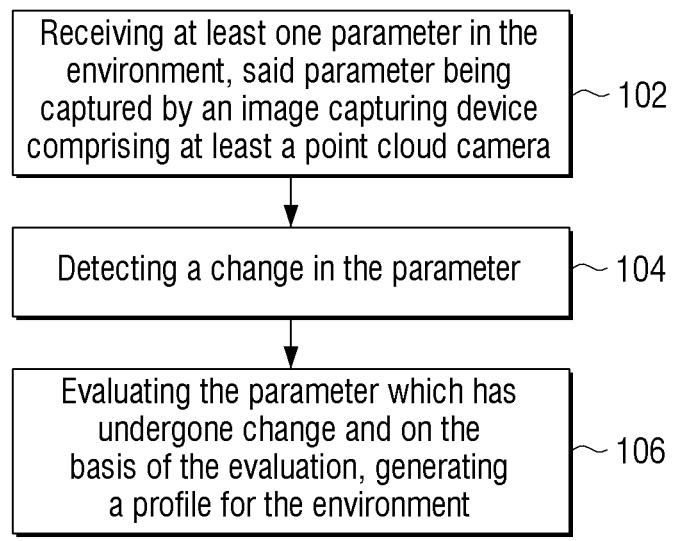
FIG. 1 is a flow chart illustrating a method for generating an environmental profile according to an exemplary embodiment.

For the purpose of promoting an understanding of the principles of the exemplary embodiments, reference will now be made to the drawings and specific language will be used to describe the same. It will nevertheless be understood that no limitation of the scope of the disclosure is thereby intended, such alterations and further modifications in the illustrated system, and such further applications of the principles of the exemplary embodiments as illustrated therein being contemplated as would normally occur to one skilled in the art.

It will be understood by those skilled in the art that the foregoing general description and the following detailed description are exemplary and explanatory embodiments and are not intended to be restrictive thereof. Throughout the disclosure, a convention employed is that in the appended drawings, like numerals denote like components.

Reference throughout the disclosure to "an exemplary embodiment", "another exemplary embodiment" or similar language means that a particular feature, structure, or characteristic described in connection with the exemplary embodiment is included in at least one exemplary embodiment. Thus, appearances of the phrase "in an exemplary embodiment", "in another exemplary embodiment" and similar language throughout this specification may, but do not necessarily, all refer to the same exemplary embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Unless otherwise defined, all technical and scientific terms used herein have the same meaning as commonly understood by one of ordinary skill in the art to which this invention belongs. The system, methods, and examples provided herein are illustrative only and not intended to be limiting.

It would be appreciated, that the output from the point cloud camera includes depth related information and hence the profile thus generated will be of higher quality as compared to a profile which is generated merely based 2-D data. In addition to the above, since the point cloud camera inherently provides depth related information, the image processing techniques involved for obtaining depth information from 2D data need not be performed. Thus, one can envisage a substantial reduction in the processing time, reduction in the complexity of the processing circuits, all of which can contribute to cost reduction.

It has also been observed that if output from the point cloud camera is used for object recognition processing, the same yields better results as compared to using output from a RGB camera. Additionally, it has been observed that if output from the point cloud camera is used for object recognition processing, the same yields better results compared to output from a RGB camera, especially when the level of illumination is low, for example, low light condition or a night condition.

Throughout the disclosure, the term "object" may encompass a living being including a human, and a non-living thing.

In an exemplary embodiment, the parameters in the environment may be received from one or more recording devices including a point cloud camera and at least one of a RGB camera, a thermal image sensor, and an audio sensor. For example, the parameters in the environment may be obtained by using the following combinations (a) a point cloud camera and a RGB camera, (b) a point cloud camera and a thermal image sensor, (c) a point cloud camera and an audio sensor, (d) a point cloud camera, a thermal image sensor and an audio sensor, (e) a point cloud camera, a RGB camera and an audio sensor. The use of thermal image sensors provide for additional enhancement in the quality of profile thus generated, as compared to use of point cloud camera alone, when the level of illumination is low, for example, low light condition or a night condition.

Various exemplary embodiments will be described below in detail with reference to the accompanying drawings.

FIG. 1 is a flowchart illustrating a method for generating an environmental profile according to an exemplary embodiment. In operation 102, a device which generates an environmental profile according to an exemplary embodiment receives at least one parameter regarding the environment. The parameters may be captured by an image capturing device. For example, point cloud data captured by a point cloud camera may be the parameters. The parameters may be captured on a continuous basis or periodically. Generally, the parameters may be associated with one or more objects present in the environment. The objects may be a living being including a human or a non-living thing present in the environment.

In operation 104, it is checked if there occurred any changes in the parameter (104). In order to detect a change, a currently received value of the parameter is compared with a benchmark value for the parameter. In case such benchmark value is not available, a change in the parameter can be detected by comparing current value of the parameter with a past value of the parameter. Alternatively, other proper values of the parameter may be used for the purposes of comparison and detection of a change in the parameter. Detection can be done by subtracting a received image frame from a past image frame.

A change in the parameter may occur due to any cause. For example, it may include, but is not limited to, a result of a natural phenomenon occurring in the environment (which has an impact on the object) or an action performed by a living being. The action performed by a living being may involve one or more other living beings or one or more non-living things.

The parameter of which change has been detected may be evaluated in operation 106. However, certain types of changes may not be considered for further evaluation. For example, a minimum threshold in terms of an extent of change may be defined and changes which are below the minimum threshold limit may be filtered out. It may be noted that the minimum threshold can be set for all or some of the parameters being monitored. As another example, changes may be filtered out on basis of time period. Specifically, it is possible to define time a period and only some changes that occurred during the time period may be considered for further evaluation. Likewise, the time period may be set for all or some of the parameters being monitored.

In operation 106, the parameter which has undergone change may be evaluated and a profile for the environment may be generated on the basis of the evaluation. The environment profile may be generated by referring to a storage device which stores an inference set corresponding to the parameter which has undergone change. However, it is not necessary that each change has a corresponding environment profile. The profile may reflect a plurality of parameters, with each of the plurality parameter being present in a wide range of states.

Also, a self-learning method may be utilized to generate the environment profile. The self-learning method may initially rely upon data contained in a storage device and thereafter, may gradually increase or decrease the number of profiles. The criterion which forms part of the environmental profile may be also modified.

Figure 2:
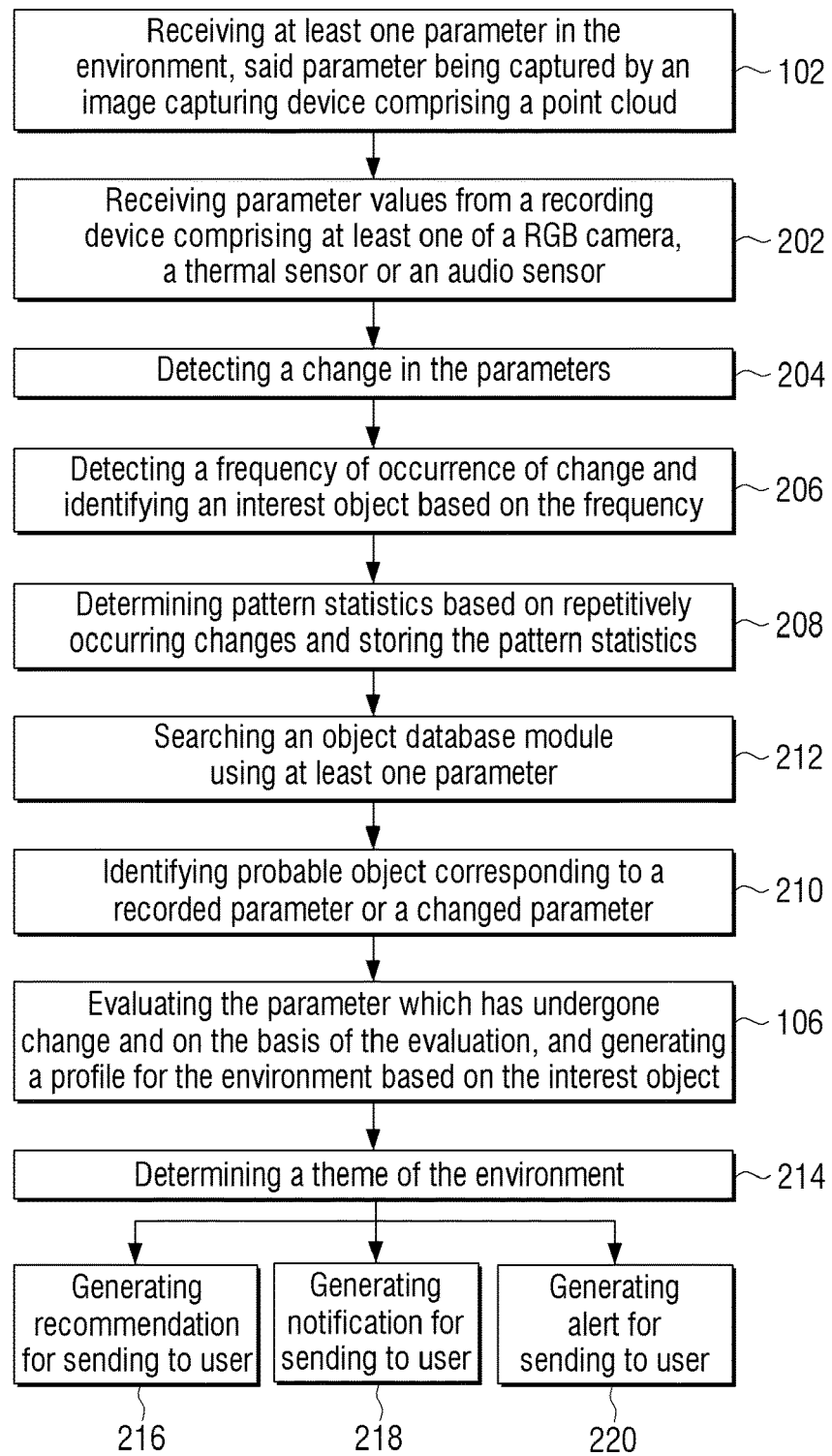
FIG. 2 is a flow chart illustrating the method of generating an environmental profile according to an exemplary embodiment.

FIG. 2 is a flow chart illustrating the method of FIG. 1 in further detail according to an exemplary embodiment.

In operation 102, one or more parameters are received from a cloud point camera.

In operation 202, one or more additional parameters may be received from a recording device. The recording device may include, but are not limited to, a RGB camera, a thermal sensor or an audio sensor.

In operation 204, changes in the received parameters may be detected. The changes in the parameters may be considered in generating a profile for the environment in operation 106.

In operation 206, a frequency of occurrence of the change may be determined.

In operation 208, a specific type of change may be observed over a period of time in the environment and a pattern statistics may be determined based on repetitively occurring changes. The pattern statistics may be stored for further use, for example, for profile generation.

In operation 212, an object database module may be queried using the received parameter.

In operation 210, an object corresponding to the recorded parameter or the changed parameter is identified. One parameter may be associated with multiple objects. In this case, a change in the parameter may be detected, and the probable object may be identified from the plurality of objects associated with the changed parameter.

In operation 106, the changed parameter is evaluated and an environmental profile is generated based on the evaluation.

In operation 214, a theme of the environment is determined based upon the detected change. The theme can be determined from a list of themes which are available in a storage device.

The environment profile may involve many applications. For example, it may be used for sending recommendations to the user (216), for sending notifications to users (218), or for sending alerts to the users (220).

Figure 3:
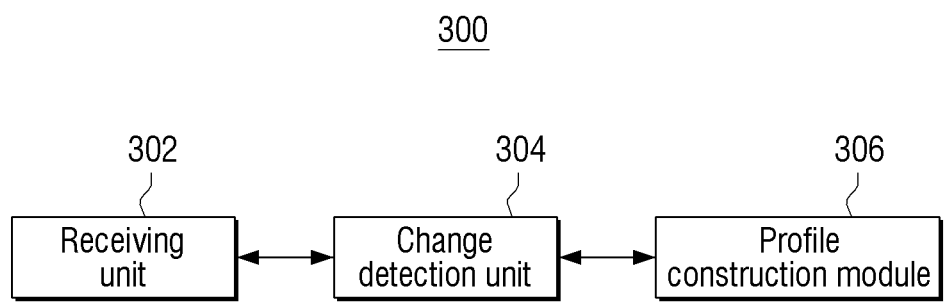
FIG. 3 is a block diagram of an apparatus for generating an environmental profile according to an exemplary embodiment.

FIG. 3 is a block diagram of an apparatus for generating an environmental profile according to an exemplary embodiment.

The apparatus 300 may include a receiving unit 302 for receiving at least one parameter in the environment from at least one recording device, e.g., a point cloud camera, a change detection unit 304 for detecting a change in the parameter, and a profile construction module 306 for generating the environmental profile. The receiving unit 302, the change detection unit 304, and the profile construction module 306 may be implemented in the form of hardware or software or as embedded components.

Figure 4:
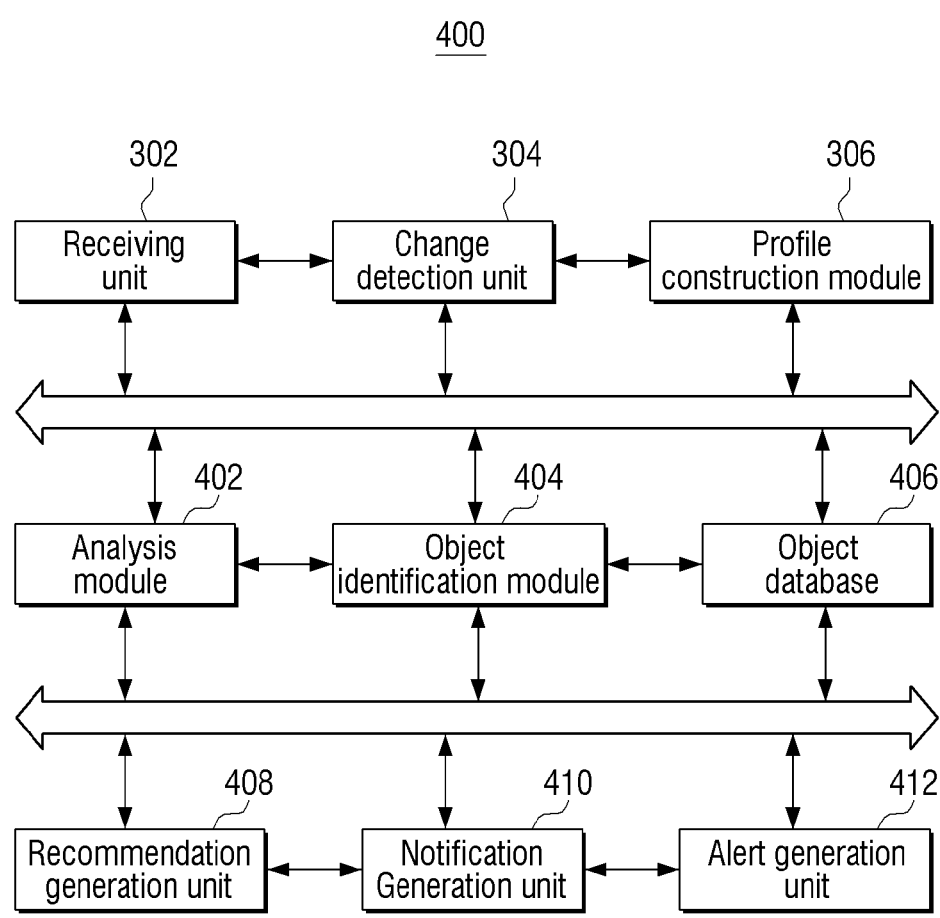
FIG. 4 is a block diagram of an apparatus for generating a environmental profile according to another exemplary embodiment.

FIG. 4 is a block diagram of an apparatus for generating a environmental profile according to another exemplary embodiment.

The apparatus 400 may include the receiving unit 302, the change detection unit 304, the profile construction module 306, analysis module 402, object identification module 404, object database 406, recommendation generation unit 408, notification generation unit 410, and alert generation unit 412.

In addition to receiving one or more parameters from a recording device such as a cloud point camera, the receiving unit 302 may receive one or more additional parameters from other recording devices, for example, a RGB camera, a thermal sensor or an audio sensor. The change detection unit 304 may detect change in the additional parameter as received from these other recording devices. The profile construction module 306 may generate a profile for the environment taking into consideration the detected change in the additional parameters. The profile construction module 306 may determine a theme of the environment based upon the detected changes. The theme may be selected from a list of themes which are available in a storage device.

The analysis module 402 may determine a frequency of occurrence of the change in the parameters. The analysis module 402 may further determine pattern statistics based on repetitively occurring changes and store the pattern statistics in a storage device for further use, for example, for environmental profile generation.

The object identification module 404 may identify probable object corresponding to a recorded parameter or a changed parameter if an association between a parameter and an object is not identified. In order to do so, the object identification module 404 may perform the search in an object database 406 using at least one captured parameter.

The recommendation generation unit 408 may generate and provide recommendations to the user. The notification generation unit 410 may generate and provide notifications to users. The alert generation unit 412 may generate and provide alerts to the users.

Figure 5:
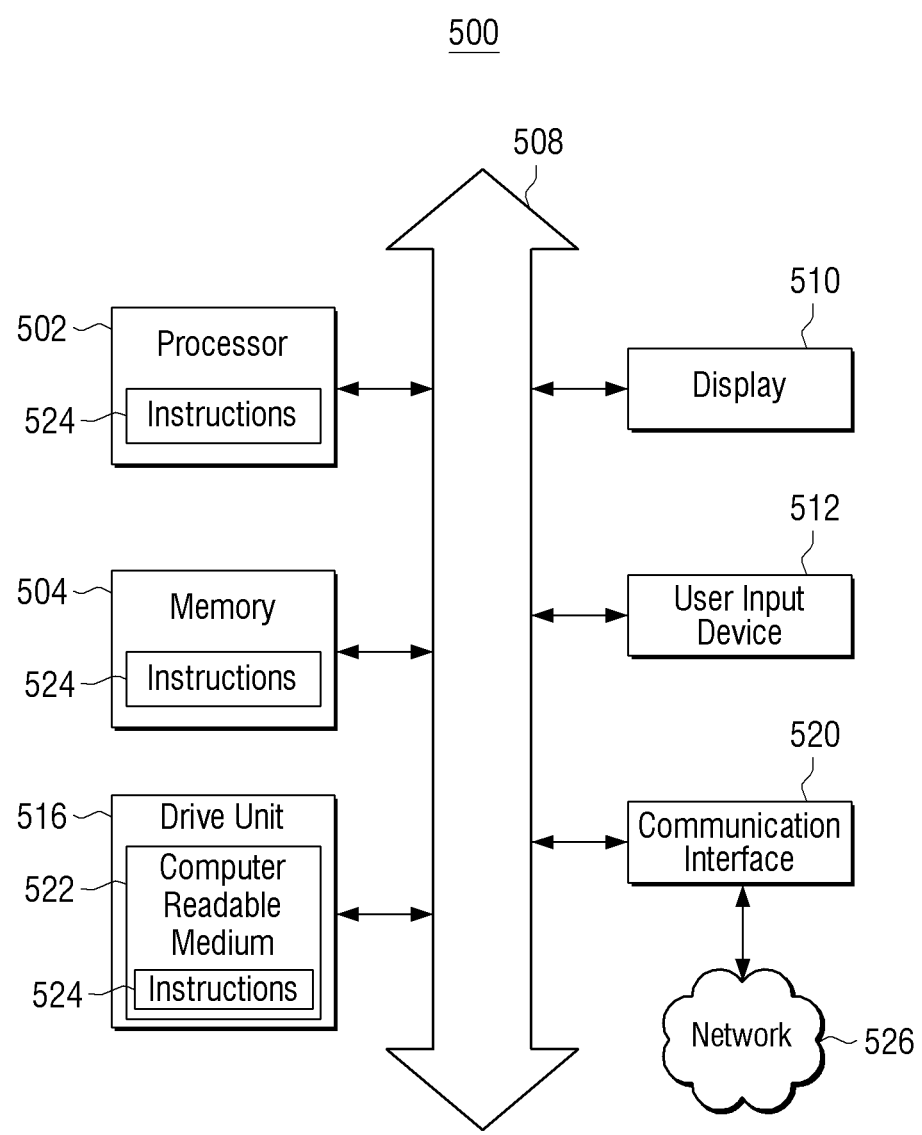
FIG. 5 is a block diagram of an apparatus for generating a environmental profile according to yet another exemplary embodiment.

FIG. 5 is a block diagram of an apparatus for generating a environmental profile according to yet another exemplary embodiment. The apparatus 500 may include a set of instructions that can be executed to cause the apparatus 500 to perform one or more of the exemplary embodiments in the disclosure. The apparatus 500 may operate as a standalone device or may be connected, e.g., using a network, to other computing devices or peripheral devices.

The apparatus 500, may be implemented as or incorporated into various devices, such as a personal computer (PC), a tablet PC, a set-top box (STB), a personal digital assistant (PDA), a mobile device, a palmtop computer, a laptop computer, a desktop computer, a television set, or any other machine capable of executing a set of instructions (sequential or otherwise) that cause the machine to perform one or more of the exemplary embodiments in the disclosure. Further, while a single apparatus 500 is illustrated in FIG. 5, the apparatus may include any collection of systems or sub-systems that individually or jointly execute a set, or multiple sets, of instructions to perform one or more functions according to the exemplary embodiments.

The apparatus 500 may include a processor 502, e.g., a central processing unit (CPU), a graphics processing unit (GPU), or both. The processor 502 may be a component in a variety of systems. The processor 502 may be one or more general processors, digital signal processors, application specific integrated circuits, field programmable gate arrays, servers, networks, digital circuits, analog circuits, combinations thereof, or other now known or later developed devices for analyzing and processing data The processor 502 may implement a software program, such as code generated manually (i.e., programmed).

The term "module" may be interpreted to include a plurality of executable modules. As described herein, the modules may include software, hardware or some combination thereof executable by a processor, such as processor 502. Software modules may include instructions stored in memory, such as memory 504, or another memory device, that are executable by the processor 502 or other processor. Hardware modules may include various devices, components, circuits, gates, circuit boards, and the like that are executable, directed, or otherwise controlled for performance by the processor 502.

The apparatus 500 may include a memory 504 which may be connected to a bus 508. The memory 504 may be a main memory, a static memory, or a dynamic memory. The memory 504 may include various types of volatile and non-volatile storage media. For example, the memory 504 may include, but not limited to, random access memory, read-only memory, programmable read-only memory, electrically programmable read-only memory, electrically erasable read-only memory, flash memory, magnetic tape or disk, optical media and the like. The memory 504 may include a cache or random access memory for the processor 502 or may be separate from the processor 502 such as a system memory. The memory 504 may be an external storage device or database for storing data. For example, the memory 504 may include a hard drive, compact disc ("CD"), digital video disc ("DVD"), memory card, memory stick, floppy disc, universal serial bus ("USB") memory device, or any other device operative to store data. The memory 504 may be operable to store instructions executable by the processor 502. The functions, acts or tasks in accordance with the exemplary embodiments may be performed by the programmed processor 502 executing the instructions stored in the memory 504. The functions, acts or tasks are independent of a particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The display unit 510 may include, but is not limited to, a liquid crystal display (LCD), an organic light emitting diode (OLED), a flat panel display, a solid state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 516. The apparatus 500 may not include the display unit 510.

The user input device 512 may allow a user to interact with any of the components of the apparatus 500. The user input device 512 may be implemented with a number pad, a keyboard, a cursor control device such as a mouse or a joystick, touch screen display, remote control or any other device operative to interact with the apparatus 500.

The drive unit 516 may include a computer-readable medium 522 in which one or more sets of instructions 524, e.g. software, can be stored. Further, the instructions 524 may embody one or more of algorithms of the exemplary embodiments as described. For example, the instructions 524 may reside completely, or at least partially, within the memory 504 or within the processor 502 during execution by the apparatus 500. The memory 504 and the processor 502 also may include computer-readable media as discussed above.

The exemplary embodiments contemplate a computer-readable medium that includes instructions 524 or receives and executes instructions 524 responsive to a propagated signal so that a device connected to a network 526 can communicate voice, video, audio, images or any other data over the network 526. Further, the instructions 524 may be transmitted or received over a bus 508 or over the network 526 via a communication. The communication interface 520 may be a part of the processor 502 or may be a separate component. The communication interface 520 may be implemented in software or in hardware. The communication interface 520 may connect with a network 526, external media, the display 510, or any other components in the computing system 500, or combinations thereof.

The term "computer-readable medium" may include a single medium or multiple media, such as a centralized or distributed database, and associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory and tangible.

The computer-readable medium may include a solid-state memory such as a memory card or other package that houses one or more nonvolatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

The apparatus 500 may be implemented with dedicated hardware implementations, such as application specific integrated circuits, programmable logic arrays and other hardware devices.

Applications of the exemplary embodiments may involve a variety of electronic and computer systems. Some exemplary embodiments may use two or more specific interconnected hardware modules or devices. Related control and data signals may be communicated between and through the modules, or as portions of an application-specific integrated circuit. Accordingly, the exemplary embodiments may encompass software, firmware, and hardware implementations.

The exemplary embodiments will be described below in detail by various scenarios.

Figure 6:
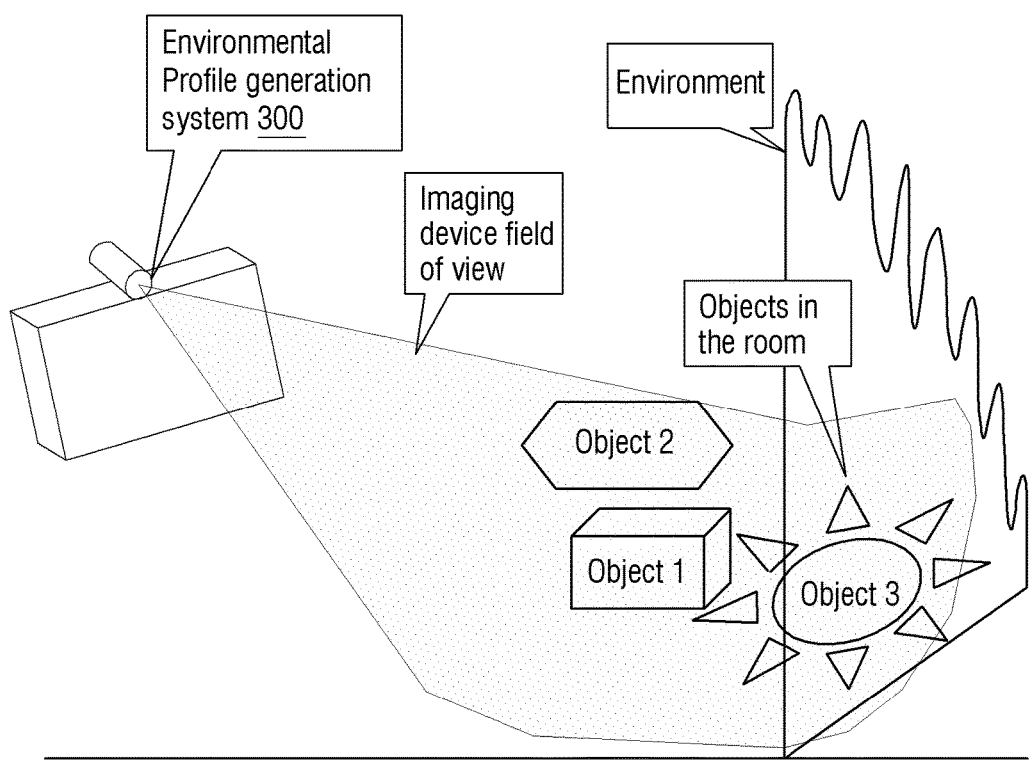
FIG. 6 illustrates an environment including three objects and a recording device for sensing at least one parameter in the environment according to an exemplary embodiment.

Use of recommendation system to assist user in life is growing day by day, but still most of the recommendation systems and algorithms rely on a user's digital life to identify user's choice and generate a profile accordingly. However, it is more desirable that a profile reflects an real environment he lives in. FIG. 6 illustrates an environment including three objects and a recording device for sensing at least one parameter in the environment according to an exemplary embodiment. In an exemplary embodiment, a point cloud camera may be used as a recording device to capture a user's living environment & real life facts. The point cloud camera may be incorporated in TV or connected to a computing device. As illustrated in FIG. 6, three objects exist in the environment of a user. It may be understood by one of ordinary skill in the art that the environment may be modified to include any other alternative objects. Another recording device may incorporate or connect with a point cloud camera to monitor the parameters of the environment. This approach has many advantages; for example,—as the captured scene is fixed, lesser data is required to be processed. Additionally, it is possible to further improve the speed and accuracy by simply analyzing the dynamic objects in the scene. Rather than a point cloud camera alone, the environment may be analyzed more accurately and rapidly with the help of other sensors, such as normal camera (or alternatively referred to as RGB camera), thermal sensor (for example, infrared sensor), audio sensors, etc.

In an exemplary embodiment, the environment, including the users and their behavior, may be analyzed using the point cloud camera. The parameters monitored and used for generating a profile may include, but are not limited to, the following:

1. Objects in the room: Kind of objects in room, e.g., electronic items, antique items, furniture, decorative items, etc;
2. Number of people watching the TV: This provides the possible user count;
3. Frequency of changes occurring in the room: How frequent things are being added/changed in the room;
4. Attributes of objects in the room, e.g., cheap/costly, modern/antique, useful/decorative, colorful/dull, etc.;
5. Color of the room and objects;
6. Lighting conditions while watching TV, etc.

Once the profile is created, the user may be provided recommendations, not only for digital content, but also for real-world items such as, clothes, electronic items, etc. Further, profiles of multiple users can be used to provide cross-user recommendations. A profile may be generated on real time basis, on time delayed basis, or on batch mode basis. The time delayed basis, may involve a time difference between the time the parameter is captured and the time the profile is generated. In the batch mode, multiple parameters may be used to generate an environment profile. In an exemplary embodiment of the batch mode, only the parameters captured during a predetermined time period may be processed to generate an environment profile. Further, a restriction may be applied on the number of the parameters to be used for generating the environment profile.

The exemplary embodiments assume:
(1) The user is interested in the objects which he uses most,
(2) Whenever an object is used, its state is changed.

So, in order to identify objects of the user's interest, objects which change their state over time need to be identified. Referring to FIG. 6, the change in state may be easily detected by using a static cloud point camera for a fixed environment. As aforementioned, additional sensors such as RGB camera, thermal sensors, audio sensors, etc. may be used to detect various kind of changes. For example, each of the RGB camera and the thermal sensor can provide information pertaining to changes, for example, in location or in physical property, e.g., a color. The sensors may continuously monitor the environment over a period of time and find the changed objects by comparing the current captured frame with previous frames. This approach results in a better accuracy & performance for detecting objects of user's interest. A user's profile may be generated based on the user's object-usage behavior and time information.

Images may be captured by a point cloud camera, and optionally one or more additional devices, such as a RGB camera, thermal sensor, etc., may process them and identify objects that are changed in the scene over a period of time. Based on the time, the environmental change pattern is recorded which is further used to prepare the environmental profile. This profile is further used to predict and assist the user in a digital/real world.

In an exemplary embodiment, the environmental profile generation system 300 may include:
1. Image capturing module
2. Image analysis module
3. Object recognition module
4. Object database module
5. Audio Capturing & Analysis module
6. Profile generation module
7. Profile based recommendation module Following is the detailed description of the modules:

1. Image capturing module: This module is responsible for capturing images from the environment. The image capturing may be done by using a point cloud camera. In addition to the point cloud camera, other devices such as RGB camera or thermal camera may be additionally used. The environment may be captured continuously (like a video stream), or may be captured only when a significant change is identified in the scene frame. This change may be detected by one or more of a point cloud camera, a RGB camera, and the thermal image sensor. The change detection threshold may be adjusted automatically based on the history, time and other parameters. Once the point cloud image is captured, contents of the other devices (the RGB camera & thermal sensor) may be stored along with the relevant information.

2. Image analysis module: This module is responsible for analyzing the captured information. In an exemplary embodiment, the captured information may contain point cloud information optionally along with RGB data and IR data. This module identifies the changes occurred in the image frame using the point cloud information and optionally using the IR data or the RGB data with different image processing techniques. One of the most elementary technique may be Background Subtraction where one can use a previous image as reference and subtract the next frame buffer to identify the regions of change. This technique can be used for all three types of sensors i.e. point cloud camera, RGB camera, and thermal sensor. Once the areas are identified, the image can be further processed by other module for object detection.

3. Object recognition module: This module may get the frame information from image analysis module and identify objects present in it. For detecting humans, a thermal image may be used as a clue. If the temperature present in the thermal images does not match one of human body, the human count may be set to zero. If some area shows the temperature matching human body temperature, further analysis may be needed using point cloud data and RGB data to find humans present. The thermal sensor is not mandatorily required to detect human presence. In the absence of the thermal sensor, the data from the point cloud camera alone may be used for human detection.

Similarly, objects may be identified based on their 3D shape. For example, point cloud data may be used to identify a cubical or a spherical surface. Once the objects are identified to have a cubical surface, then RGB data may be used along with the identified cubical surface as a query to perform a search in cubical object database. The temperature data may also be used along with the shape data. For example, the temperature data and surface data may be fused together to make a unique device signature.

4. Object database module: This module may contain information about general objects which may be present in the specific environment, e.g., a user's living room. The database may contain one or more of 2D image, and 3D point cloud data, temperature signature of objects. This information may be used later to identify the objects available in the scene.

5. Audio capturing & analysis module: This module may continuously monitor audio signals detected in the environment and analyzes them to identify a type of the audio signals, e.g., noise, music, speech etc. If it turns out to be music, it may be further analyzed to identify property or genre of the music, e.g., soft, rock, jazz, classical, etc. This information may be combined with other modules to improve the profile. In the absence of the audio information, this module may rely upon the information received from the point cloud camera or other additional devices.

6. Profile generation module: This module may generate an environmental profile based on the identified objects in the scene over a period of time. The object properties, e.g., name, color, type, place, time, may be used to generating the profile. For example, user's clothing purchase pattern may be identified by analyzing the images of user's clothing over a period of time. This pattern may be used to recommend clothing in that particular month.

Similarly, if different kinds of electronic gadgets, such as mobile, laptop, and tablets, are identified in the scene, it may be determined that that the user is highly interested in technology, and a recommendation of the related products may be generated.

The profile may reflect many other information, such as sleeping pattern, color pattern of clothes/device, light color and pattern, object placement, object organization in the room, etc.

7. Profile based recommendation module: This module may provide recommendations for a user based on the generated profile. Here, cross-user recommendations may be used to suggest new things to one user based on another user's profile when their profiles are similar. For example, if one's profile reflects his interest in guitars based on guitar pictures and guitar sounds detected in his room, then a guitar music event may be recommended to the user if the guitar music event is detected in other users' profiles similar to his.

Because the objects are real (not the digital objects), the recommendations provided by the exemplary embodiments will add value to both the user's digital world as well as the real world.

Thus, one of the advantage of the exemplary embodiments is that it provides for an online/offline recommendation system based on the inputs related to a real world. In the exemplary embodiments, the user's closeness to and interaction pattern with various objects may be identified in an efficient way. This information may be utilized both in a virtual world and in a real world. For example, if a user's lifestyle is determined to be lavish based on presence of costly items in the scene, he may be suggested high class items or digital content. So the user may get recommendations for both a virtual world and a real world.

The environmental profile focused on an environment profile, not on an individual user, a multi-user recommendation may be provided in an exemplary embodiment. For example, if the environment involves multiple users, the environment profile may include the multiple users and recommendations generated based on the profile may be relevant to the multiple users. On the other hand, if the environment involves only one user, a recommendation may be generated only for the user.

While analyzing the environment, two things are most importantly monitored: objects which changes (physical movement & state change) and time of change. An environmental profile may be generated based on this observation. For example, assume that a guitar is being used in the evening and a microwave is being used around the noon. Without knowing if these actions are taken by one user, the apparatus according to an exemplary embodiment may generate a profile and a recommendation of using the guitar in the evening and using the microwave in the daytime. On the other hand, if the both actions are identified as taken by the same user, for example, by using user identification, face recognition, or any other technique, a recommendation may be generated to suggest to the user using the guitar or the microwave anytime.

Data output from a point cloud camera may be used for other purposes than creation of an environment profile. For example, the point cloud camera may be used for gesture detection. Likewise, a thermal sensor may be used for human presence detection as well as for environment profile generation. Thus, a system including the device can be configured to perform functionality in addition to generating environment profile generation.

As analyzing the real world objects is quite challenging, objects may be classified based on point cloud camera data. Especially, when it comes to detecting living beings, the living objects may be classified based on their temperature using low resolution thermal sensors. These techniques may be very helpful in detecting a movement in low light or dark environment. Also, identifying humans using a thermal camera may be much easier than using other image processing techniques such as face/body recognition. For example, a combination of point cloud data having low resolution and temperature data of low resolution thermal sensors may be used to identify humans.

In an exemplary embodiment, objects may be monitored continuously to identify modified objects in a temporal domain. This means that the objects which face some change over a time period are the objects of interest. The change may be anything ranging from position change to state change. For example, Such a change may occur when a user moves a handheld device from one place to another (physical change), when a user opens a door of the microwave (state change), or when a digital photo frame changes its content (state change). All these changes may be monitored and easily detected via continuous monitoring. Once a change is detected, the area where such a change occurred may be identified from the image frame and the changed 3D object structure may be extracted using point cloud data.

This extracted 3D structure may be checked in the database to find the properties, such as nature, type, name, and brand, etc., of the corresponding object. Once the details or knowledge about the changed object are available, its usage pattern may be determined based on the changes of the object recorded over time. The properties and the usage pattern of the object may be used to create an environmental profile which can be further used as input for a recommendation system.

Figure 7:
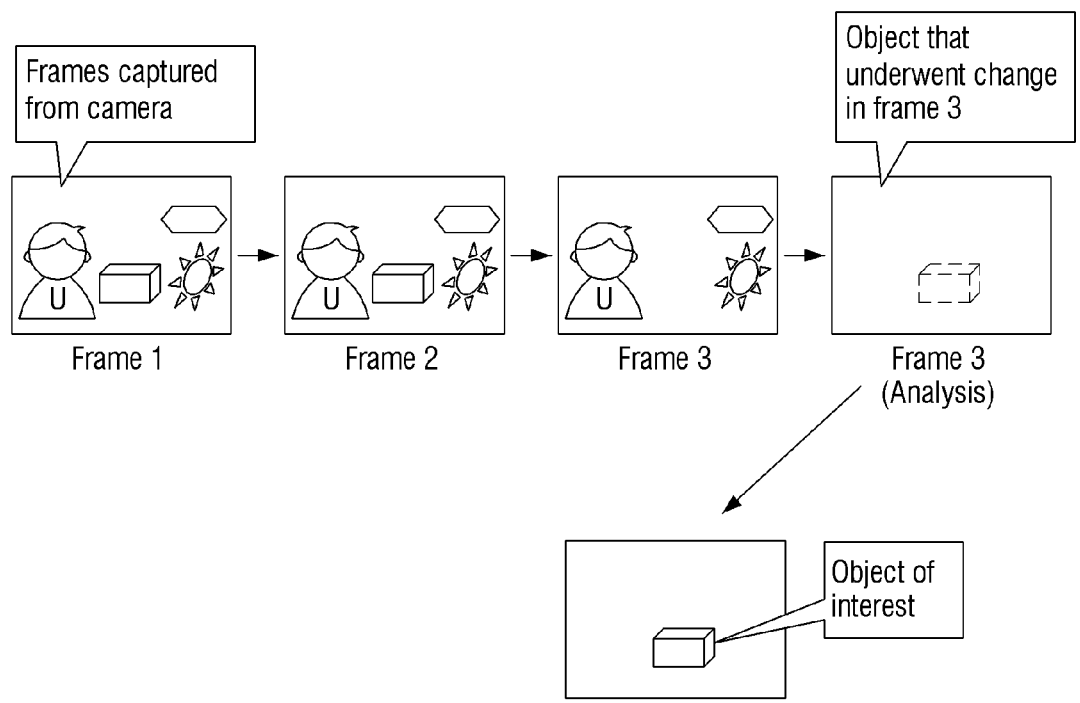
FIG. 7 illustrates a concept of detecting a change based on background subtraction according an exemplary embodiment.

FIG. 7 illustrates a concept of detecting a change based on background subtraction.

Data from various hardware sensors, such as RGB camera, point cloud camera, thermal Camera and microphone, may be used as an input to find a change in the environment state by comparing it with previous state. The object recognition process may be triggered after some major changes are detected. The detection may be done by frame by frame comparison or by employing some probabilistic model to analyze the object change behavior. Once the change is detected, then the changed object is extracted from the frame and is further analyzed. Referring to FIG. 7, it can be observed that there is no change between frame 1 and frame 2, but there is a change between frame 2 and frame 3. By applying background subtraction, an analyzed frame 3 is produced. Using the analyzed frame and object database, the object which has changed may be identified.

As aforementioned, a change of objects may occur in various forms. It may be a physical movement or a state change of objects. For example, a state change may occur when a human wears different clothes. By using the color, temperature and Point cloud properties, the object and its change may be identified easily.

In an exemplary embodiment objects of the user's interest may be identified when they change their state frequently. By continuously monitoring the user's attire, the type of clothes (normal or party wear) may be identified and it may be predicted when he is going to have a party.

Based on the type of objects and their changes, a profile can be generated for the user. For example, a profile may indicate the nature of user, e.g., party lover. Based on this profile many things may be done ranging from automatic alerts (for possible future events) to product recommendation (new products similar to user's liking).

Figure 8:
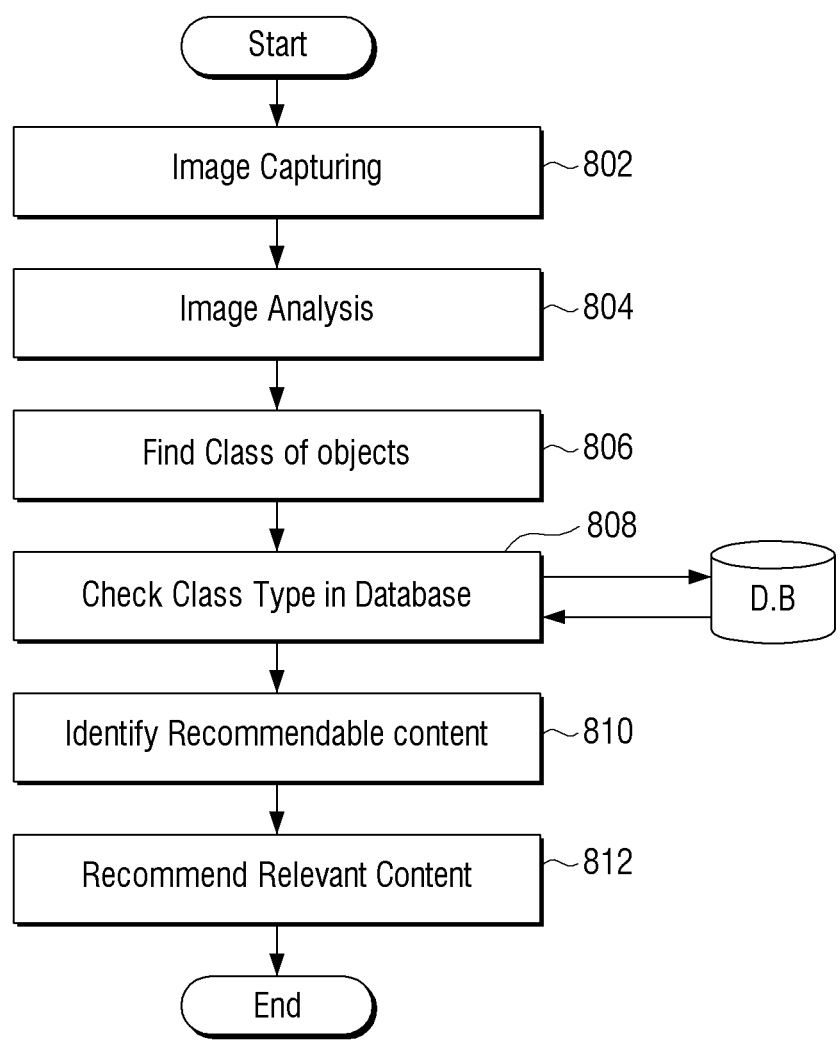
FIG. 8 is a flow chart illustrating a method for providing recommendations based on an environmental profile according to an exemplary embodiment.

FIG. 8 is a flow chart illustrating a method for providing recommendations based on an environmental profile according to an exemplary embodiment.

In operation 802, the captured image is received.

In operation 804, the received image is analyzed. The image analysis may be performed in a manner as illustrated in FIG. 7.

In operation 806, a class of object is determined.

In operation 808, once the class of the object is determined, a search is performed in an object database for the particular object.

In operation 810, a recommendable content is identified.

In operation 812, a recommendation is provided to the user.

For example, if presence of children and children-related objects, such as toys, walker, etc., are detected, an environmental profile may be generated based on the detected objects, and then a recommendation of children related TV channels and similar content may be provided to the user on the basis of generated environment profile.

Figure 9:
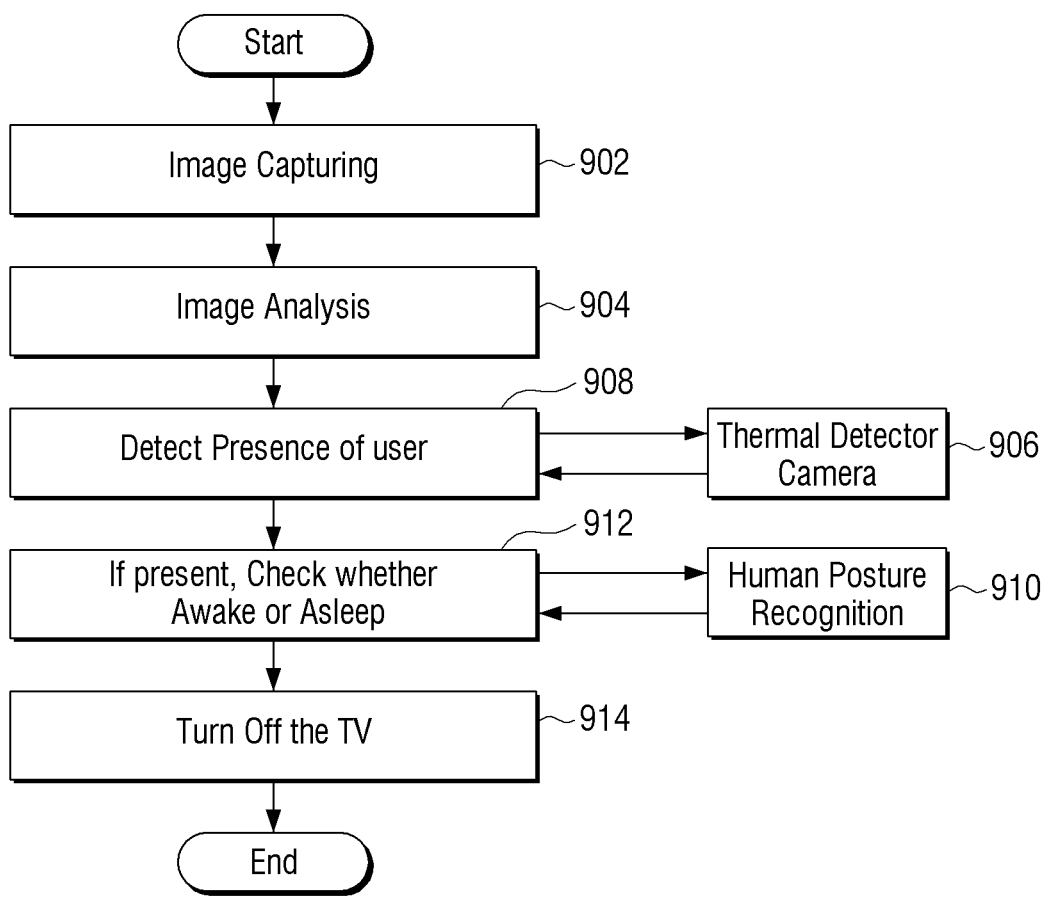
FIG. 9 is a flow chart illustrating a method for providing recommendations based on an environmental profile according to another exemplary embodiment.

FIG. 9 is a flow chart illustrating a method for providing recommendations based on an environmental profile according to another exemplary embodiment In operation 902, the captured image is received.

In operation 904, the image is analyzed. The image analysis may be performed in a manner as illustrated in FIG. 7.

In operation 906, Data from thermal sensors may be received.

In operation 908, Presence of user is detected using the data from thermal sensors along with the output of the image analysis.

In operation 910, if presence of user is detected, human posture recognition is performed.

In operation 912, an outcome of the human posture recognition is used for determining whether the user is awake or sleeping.

In operation 914, in case the user is asleep, a TV may be controlled, for example, switched OFF.

As above, a control signals for a device may be provided as a recommendation on the basis of generated environmental profile. Such application may be achieved through detection of presence or absence of persons using one or more of thermal sensor, point cloud camera, and RGB camera over a period of time. More specifically, the user's 3D body posture may also be learned over a period of time and it may be determined if he is sleeping.

Figure 10:
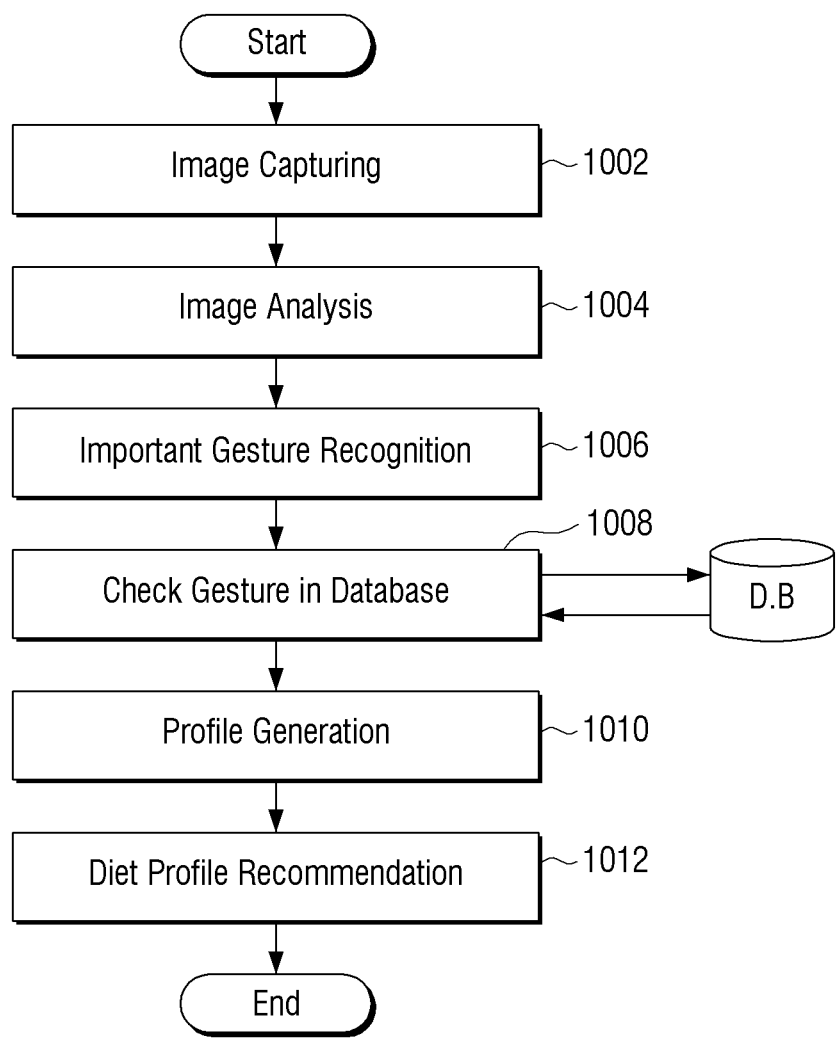
FIG. 10 is a flow chart illustrating a method for providing recommendations based on an environmental profile according to yet another exemplary embodiment.

FIG. 10 is a flow chart illustrating a method for providing recommendations based on an environmental profile according to yet another exemplary embodiment.

In operation 1002, the captured image is received.

In operation 1004, the image is analyzed. The image analysis may be performed in a manner as illustrated in FIG. 7.

In operation 1006, based on the analyzed image, gesture recognition is performed.

In operation 1008, based on the recognized gesture, an activity is identified by referring to a database.

In operation 1010, based on the identified activity, a profile is generated.

In operation 1012, a recommendation suitable to the profile is fetched and provided to the user.

Based on continuous monitoring of body posture, food habits and exercise habits of the user, an environmental profile may reflect calorie/nutrition profile of the user. So, the user may be provided with periodical health recommendations and targeted advertisements based on the environmental profile.

Figure 11:
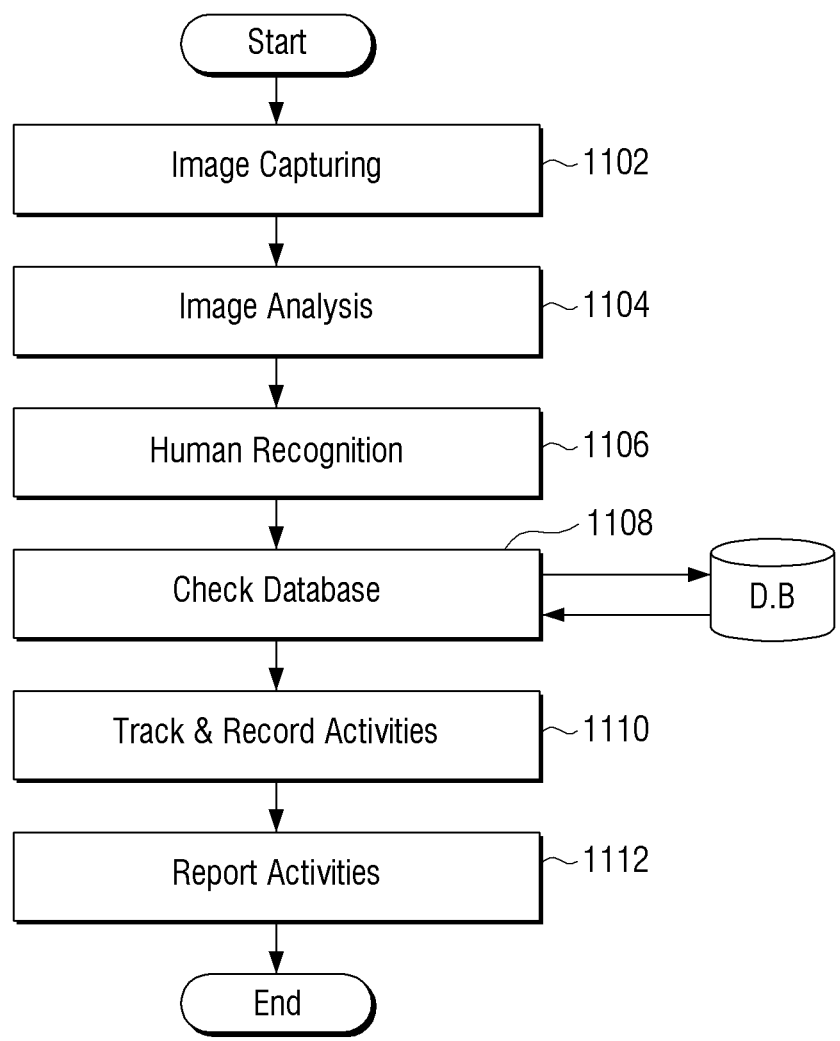
FIG. 11 is a flow chart illustrating a method for providing recommendations based on an environmental profile according to yet another exemplary embodiment.

FIG. 11 is a flow chart illustrating a method for providing recommendations based on an environmental profile according to yet another exemplary embodiment.

In operation 1102, the captured image is received.

In operation 1104, the image is analyzed.

In operation 1106, based on the analyzed image, a human recognition is performed.

In operation 1108, a database is queried and information pertaining to activities performed by the recognized human are retrieved.

In operation 1110, the human is monitored for the activities.

In operation 1112, the activities performed by the human are reported.

An exemplary embodiment may construct an environment profile dedicated to the user. If a user is available daily at home, the user may be most probably a homemaker, a retired professional or a patient. Accordingly, based upon the constructed profile specific to the user, the number of hours of presence, the type of work done, etc., may be monitored.

Figure 12:
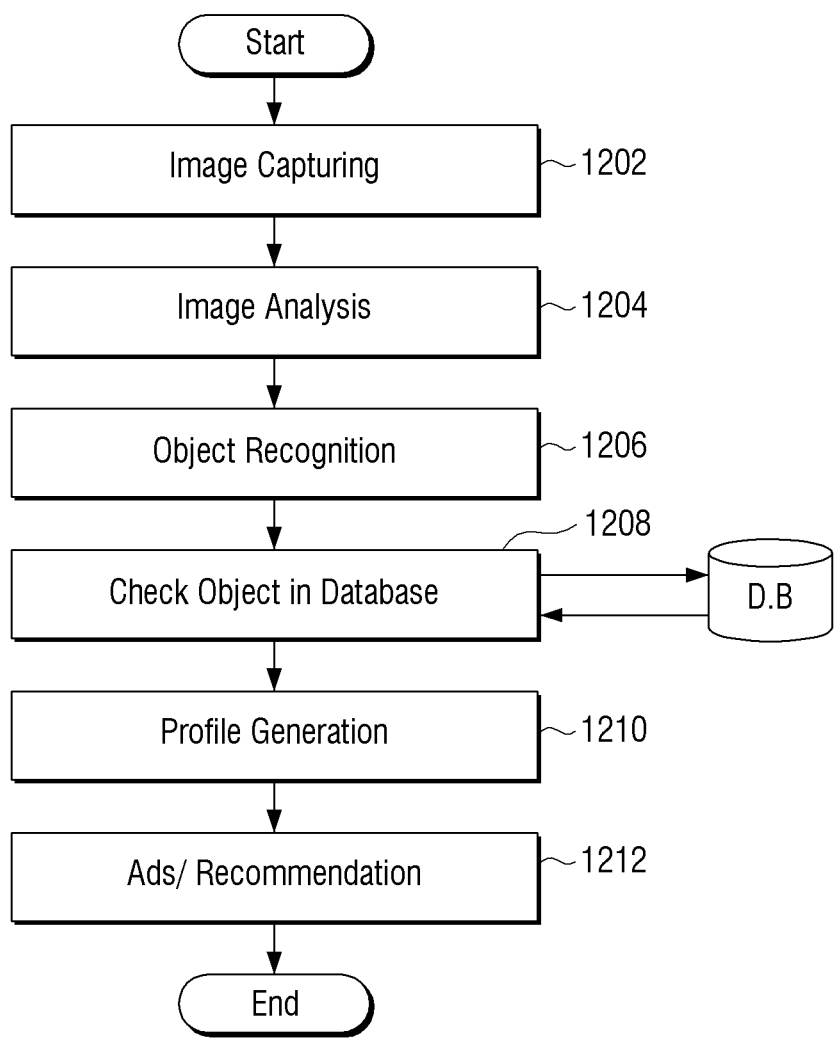
FIG. 12 is a flow chart illustrating a method for providing recommendations based on an environmental profile according to yet another exemplary embodiment.

FIG. 12 is a flow chart illustrating a method for providing recommendations based on an environmental profile according to yet another exemplary embodiment.

In operation 1202, the captured image is received.

In operation 1204, the image is analyzed.

In operation 1206, based on the analyzed image, an object is recognized.

In operation 1208, a database is queried and information pertaining to objects of the same category are retrieved.

In operation 1210, a profile is generated on the basis of the information.

In operation 1212, information of similar products may be provided to the user.

Based on detected objects, recommendations or advertisements regarding products pertinent to the objects may be provided to the user. For example, if a microwave is placed in a room, the user may be shown advertisements of a special cutlery and other specific utensils related to the microwave.

Figure 13:
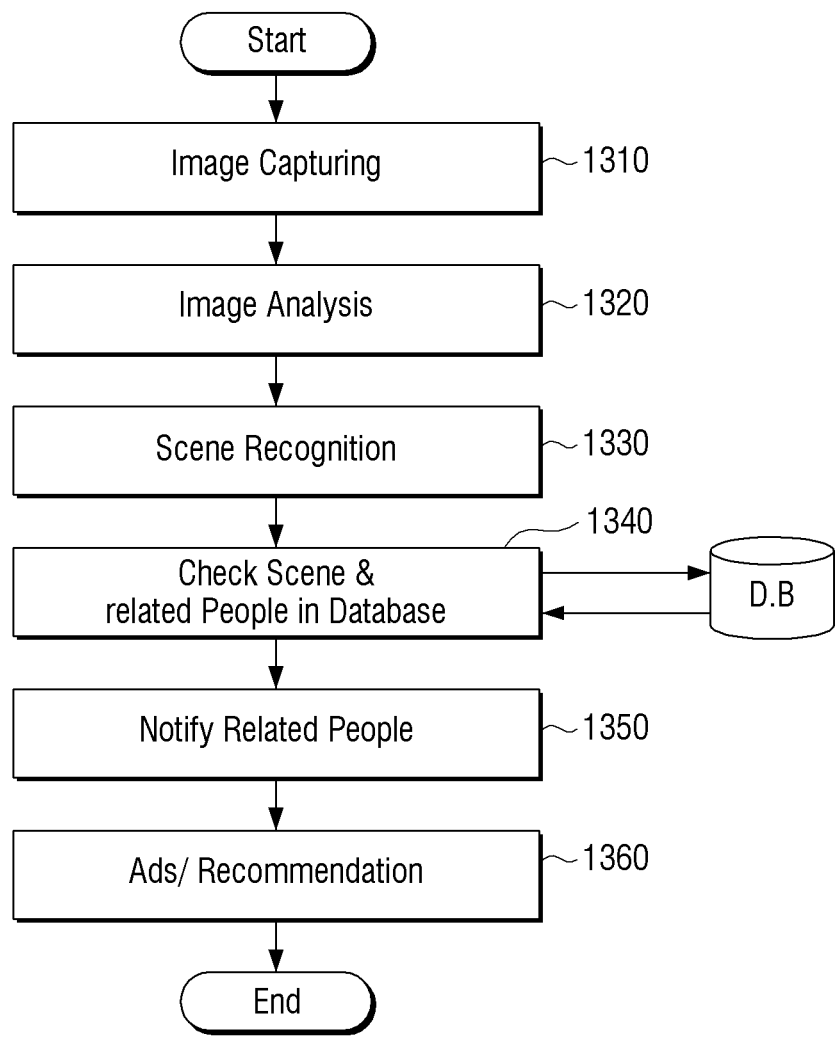
FIG. 13 is a flow chart illustrating a method for providing recommendations based on an environmental profile according to yet another exemplary embodiment.

FIG. 13 is a flow chart illustrating a method for providing recommendations based on an environmental profile according to yet another exemplary embodiment.

In operation 1310, the captured image is received.

In operation 1320, the image is analyzed.

In operation 1330, based on the analyzed image, an environment profile is generated in the form of a scene or a theme.

In operation 1340, a database is queried and information pertaining to the scene or theme, for example, contact information of other users who should be notified of events regarding the scene or theme, are retrieved.

In operation 1350, on the basis of the retrieved information, notification may be provided to people related to the environmental profile.

In operation 1360, recommendations or information of products pertinent to the scene may be provided based on the environmental profile.

In an exemplary embodiment, a theme of a room may be predicted based upon the generated environmental profile and a real-time notification may be provided to the user. If the theme has been identified as a party or celebratory ambience, associates of the user listed in the environmental profile may be provided with a real-time notification. Such notifications may be also sent when a user is doing a specified task, for example, piano practice.

Figure 14:
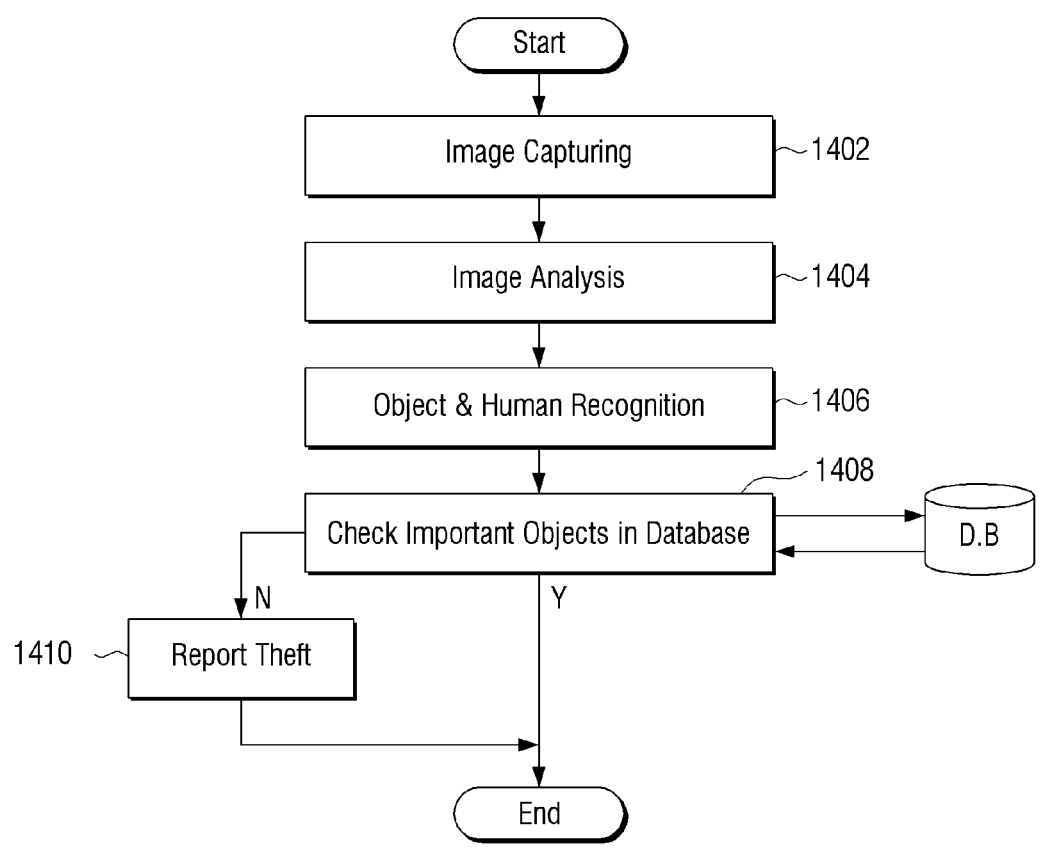
FIG. 14 is a flow chart illustrating a method for triggering an alert based on an environmental profile according to an exemplary embodiment.

FIG. 14 is a flow chart illustrating a method for triggering an alert based on an environmental profile according to an exemplary embodiment In operation 1402, the captured image is received.

In operation 1404, the image is analyzed.

In operation 1406, based on the analyzed image, one or more objects are recognized.

In operation 1408, a database is queried about information of the objects.

In operation 1410, if there is a missing object in a particular environment, an alarm may be triggered.

Upon monitoring and analyzing point cloud data over a period of time, missing object in the environment may be detected and real-time alerts may be triggered. For example, locker, safe, etc. may be designated as 'Object of Importance.' After the object recognition phase, identified objects may be compared with 'Objects of Importance' listed in the object database. If one or more of the important objects are not present in the room or has been dismantled or damaged, irrespective of the extent of change of state, an alarm may be triggered as a real-time notification. In other words, when the object has been taken out of the room, either forcefully or gently, a real time notification in the form of an alarm may be provided to the user based upon the generated environment profile.

The scenarios illustrated with reference to FIGS. 8-14 should not be construed as limiting the exemplary embodiments and the disclosure is extendible to cover other foreseeable scenarios as well.

Benefits, other advantages, and solutions to problems have been described above with regard to exemplary embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the method in order to implement the inventive concept as taught herein.

The drawings and the forgoing description give exemplary embodiments. Those skilled in the art will appreciate that one or more of the described elements may well be combined into a single functional element. Alternatively, certain elements may be split into multiple functional elements. Elements from one exemplary embodiment may be added to another exemplary embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the disclosure is by no means limited by the exemplary embodiments. Numerous variations, whether explicitly given in the specification or not, such as differences in structure, dimension, and use of material, are possible. The scope of the disclosure is at least as broad as given by the following claims.

What is claimed is:

1. A method performed by an apparatus for obtaining an environmental profile, the method comprising:
   capturing a plurality of images of an environment repeatedly;
   identifying a change of objects in the plurality of images based on a difference between the plurality of images;
   identifying an interest object from among the objects based on a frequency of the change of the objects;
   generating an environmental profile indicating interests of a user based on properties of the interest object; and
   providing a recommendation about at least one of an event or a product matching the interests of the user based on the environmental profile.

2. The method of claim 1, wherein the capturing comprises capturing repeatedly the environment by at least one of a RGB camera, a thermal camera, a depth camera, and a point cloud camera.

3. The method of claim 1, further comprising:
   generating a recommendation for a user related to the environment based on the environmental profile.

4. The method of claim 1, wherein the generating comprises:
   generating the environmental profile based on a time when the change of the objects is identified and a type of the change of the objects.

5. The method of claim 1, further comprising:
   analyzing an audio signal of the environment using an audio sensor,
   wherein the detecting comprises detecting the change of the object based on the audio signal.

6. The method of claim 1, wherein the generating comprises generating the environmental profile based on relevance between the image and a user.

7. The method of claim 1, wherein the change of the object comprises at least one of addition, deletion, replacement, modification, change of location with respect to the object.

8. The method of claim 1, further comprising:
outputting at least one of recommendation, notification and warning for a user based on the change of the object.

9. The method of claim 1, further comprising:
determining a user's usage pattern of the object based on the change of the object,
wherein the generating comprises generating environmental profile based on the usage pattern of the user.

10. An apparatus for obtaining an environmental profile, the apparatus comprising:
a camera; and
a processor configured to:
control the camera to capture a plurality of images of an environment repeatedly,
identify a change of objects in the plurality of images based on a difference between the plurality of images,
identify an interest object from among the objects based on based on a frequency of the change of the objects,
generate an environmental profile indicating interests of a user based on properties of the interest object, and
provide a recommendation about at least one of an event or a product matching the interests of the user based on the environmental profile.

11. The apparatus of claim 10, wherein the camera comprises at least one of a RGB camera, a thermal camera, a depth camera, and a point cloud camera.

12. The apparatus of claim 10, wherein the profile generator generates a recommendation for a user related to the environment based on the environmental profile.

13. A method performed by an apparatus for obtaining an environmental profile, the method comprising:
capturing parameters representing a plurality of images of an environment of a user repeatedly using at least one recording device;
identifying objects in the plurality of images and a change of the objects based on a difference between the plurality of images;
identifying an interest object from among the objects based on a frequency of the change of the objects;
generating an environmental profile indicating interests of a user based on properties of the interest object; and
providing a recommendation about at least one of an event or a product matching the interests of the user based on the environmental profile.

14. The method of claim 13,
wherein the parameters comprise point cloud data of the object.

15. The method of claim 14, wherein the detecting comprises:
extracting a 3D exterior of the object based on the point cloud data; and
retrieving object information matching the 3D exterior from an object database.

16. The method of claim 13,
wherein the object comprises a human related to the environment.

17. The method of claim 13,
wherein the generating comprises:
comparing the parameters with old parameters previously detected from the environment;
detecting a change of the environment based on a result of the comparing; and
analyzing the characteristic of the environment based on the change.

18. The method of claim 17,
wherein the characteristic of the environment comprises a behavior pattern of a human related to the environment.

19. The method of claim 13, further comprising,
outputting a control signal for controlling at least one device existing in the environment based on the environmental profile.

* * * * *